July 26, 1949.　　　　　G. I. McBRIDE　　　　　2,477,414
PNEUMATIC DUST CONVEYER
Filed July 15, 1944　　　　　　　　　　　　　2 Sheets-Sheet 1

INVENTOR.
GERALD I. McBRIDE
BY

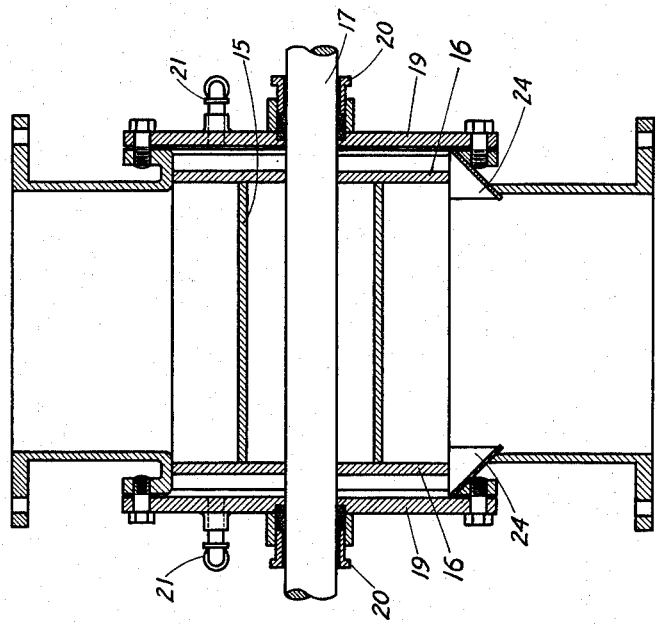

Patented July 26, 1949

2,477,414

UNITED STATES PATENT OFFICE 2,477,414

PNEUMATIC DUST CONVEYER

Gerald I. McBride, Burlingame, Calif., assignor, by mesne assignments, to The Permanente Metals Corporation, a corporation of Delaware Application July 15, 1944, Serial No. 545,147

6 Claims. (Cl. 302—52)

This invention relates to pneumatic conveying, and more particularly it relates to a method and means for conveying pyrophoric material in an inert atmosphere.

In the handling of fine materials, particularly fine materials having pyrophoric characteristics, such as the furnace product of the carbothermic process for the manufacture of magnesium, considerable difficulty is encountered in conveying the material from one point to another. This difficulty is increased as the size of the operation increases.

In the manufacture of metallic magnesium by the carbothermic process the above-mentioned furnace product, which may be referred to as "magnesium dust," comprises a mixture of magnesium having a particle size of less than one micron, carbon and magnesium oxide, along with carbon monoxide gas. After separation from the latter gas the magnesium dust is generally compacted or otherwise treated so as to prepare it for distillation or sublimation to permit its recovery in a solid state. Due to the fine particle size of the magnesium this material oxidizes very rapidly and is extremely pyrophoric. As a consequence it is hazardous to handle and must be kept in an entirely closed system without exposure to the atmosphere or else must be wetted down in an inert liquid medium such as a liquid hydrocarbon or the like.

Heretofore, in closed system operations the magnesium dust has been conveyed by a screw conveyor system or similar arrangement. However, this system is impractical, particularly in large scale operation, because of the high cost of equipment and the lack of flexibility of the equipment, particularly where the dust has to be transported between points spaced a considerable distance apart. There are also disadvantages in wetting the dust down with a liquid medium, for example a liquid hydrocarbon, because, as a result of the liquid medium, impurities are entrained in the solid crystalline metal recovered from the dust when it is subjected to distillation or sublimation.

It is the object of the present invention to provide a method and means for conveying the magnesium dust or the like from the furnace or any other location to a point spaced therefrom in an efficient manner which avoids the difficulties referred to above. Another object of the invention is to agglomerate the particles of magnesium dust so conveyed so that they may be readily pelleted without the addition of a binding agent which would tend to contaminate the solid magnesium recovered upon distillation or sublimation.

According to the invention the magnesium dust is directed to a point where it is propelled by a jet of inert gas into a system of pipes leading to the desired point. The form of apparatus used in carrying out the invention comprises a vertical system which makes it possible to take advantage of the forces of gravity in feeding the dust to the jet of gas though the same system may be operated satisfactorily in horizontal arrangement.

The invention can be more fully understood by reference to the accompanying drawings which illustrate the apparatus which has been found most useful.

In the drawings:

Fig. 2 is an enlarged view of a portion of the mechanism illustrated in Fig. 1 showing a combination dust seal and rotary dust feeder in vertical section, and Fig. 3 is a sectional view taken along the line III—III of Fig. 2.

Figure 1:
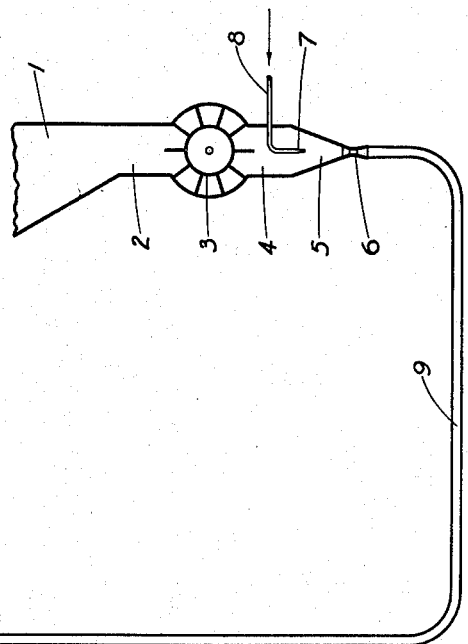
Fig. 1 is a diagrammatic view of an apparatus embodying the present invention.
Figure 1:
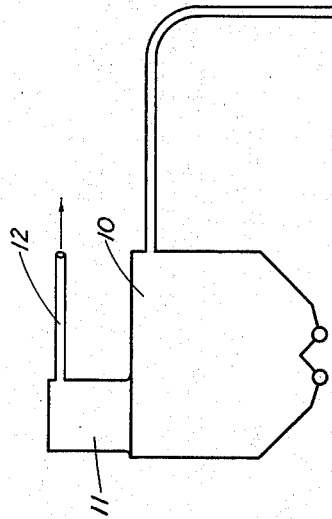

Referring to the drawings in detail and particularly Fig. 1 a dust bin 1 or other container for dust to be conveyed is shown as discharging into a vertical pipe 2 which communicates with a combination gas seal and rotary dust feeder 3. The combination seal and feeder 3 comprises a plurality of radially extending vanes rotating in a cylindrical housing to receive dust at an opening in the upper side of the said housing with which the pipe 2 communicates and to discharge the same downwardly into a pipe 4 which communicates with a similar opening in the lower side of the housing. The pipe 4 is of substantially the same diameter as the pipe 2 but converges downwardly in a tapered or conical portion 5 which communicates at its lower end with a Venturi tube 6. A nozzle 7 is disposed axially of the conical portion 5 for directing a jet of gas toward and through the Venturi tube 6. The nozzle 7 is connected with a pipe 8 which communicates with a source of gas under pressure. The term "gas" as used herein refers to natural gas, hydrogen, helium, nitrogen or any other gas inert in the presence of a finely divided pyrophoric substance such as magnesium powder, though it is of course, to be understood that air or any other gases may be used for handling other types of dust.

The Venturi tube 6 communicates at its lower end with a conveyor conduit 9 which, though considerably larger than the restricted orifice of the Venturi tube, is preferably smaller in diameter than the pipe 4, this conduit 9 leads to the point to which the dust is to be delivered, shown in the drawing as a dust bin 10. The pipe preferably enters the dust bin adjacent the top thereof as indicated and the dust bin may be provided with a conventional bag filter 11 having a gas outlet pipe indicated at 12.

In the operation of the apparatus herein described dust from the bin 1 is discharged downwardly by the rotary feeder 3 and falls by gravity through the pipe 4 past the nozzle 7 so that, due to the action set up by the nozzle, it becomes mixed with the gas discharged thereby and is violently precipitated through the Venturi tube to enter the conveyor conduit 9. The gas entering conduit 9 advances at high velocity to the bin 10. The further expansion of the gas entering the bin 10, and the accompanying reduction in velocity thereof, causes the greater volume of the dust particles to settle in the bin. The gas passes upwardly through the bag filter 11 wherein any dust which failed to settle in the bin is entrapped while the clean gas passes outwardly through the discharge pipe 12. It has been found that this method of conveying magnesium dust tends to bring about agglomeration of the very fine dust particles probably because of their impingement upon each other and upon the walls of the conveyor pipe during their travel therethrough. The dust, owing to such agglomeration, not only settles more readily in the dust bin or other container to which it is directed but results in a product which may be readily pelleted without the addition of contaminating binding agents. This results in the reduction in the volume of impurities which is carried over into the final product of solid crystalline metal.

Figs. 2 and 3 of the drawings show the combination gas seal and dust feeder 3 as comprising a plurality of radial vanes 14 mounted on a cylinder 15 which has end plates 16 fixed to a shaft 17 for rotation therewith, the shaft being rotated by an external source of power, not shown. The vanes 14 rotate in a cylindrical housing 18 the ends of which are closed by end plates 19 through which the shaft 17 passes with suitable sealing means such as stuffing boxes indicated at 20.

As the end plates 16 of the rotor move relative to the end plates 19 of the housing there is some danger that the fine dust which is conveyed through the feeder will accumulate between these relatively moving parts and eventually interfere with the operation of the feeder. To prevent this, the end plates 16 and 19 are spaced apart a considerable distance as shown, and a supply of gas is directed to the intervening space to prevent any appreciable amount of dust from lodging therein. Gas for this purpose is supplied through pipe 21 controlled by valve 22 and communicating with a pipe 23 with which the supply pipe 8 of the nozzle 7 is also connected. The gas from the pipe 21 enters, as best illustrated in Fig. 3, adjacent the upper portions of the spaces between the end plates 16 and 19 and passes downwardly to discharge through troughs 24 which communicate with the interior of the pipe 2 directly below the rotary feeder. The gas discharging from the troughs 24 thus impinges on and tends to disperse the body of dust particles falling from the feeder just prior to their delivery to the action of the nozzle and the tube. The natural effect of the jet of gas produced by the nozzle 7 is to create a partial vacuum or suction effect in the area behind the nozzle which area is within the pipe 2. This suction tends to convey the dust, expelled by the feeder 3, past the nozzle and into the conveying stream. The efficiency of this conveying action may be increased by the admission of gas at a point above or behind the nozzle, which gas is termed secondary as distinguished from the primary gas which enters through the nozzle.

The flow of gas to the space between the end plates of the rotary feeder as hereinbefore described is one method of supplying secondary gas. Another method which may be used alternatively or in conjunction with the method herein described is illustrated in Fig. 2 wherein a pipe 25 controlled by a valve 26 is shown as leading from the main gas supply pipe 23 to the conical member 5 which it enters, preferably tangentially, somewhat above the outlet of the nozzle 7. Gas entering at this point and in this direction tends also to increase the turbulence of the dust about to be directed through the Venturi tube. The means last described for supplying secondary gas is useful for supplying a constant flow of gas when desired or may be used intermittently to relieve any possible congestion or clogging in the member 5 which may occur in the event of faulty or irregular operation of the system.

While experiments with apparatus of the kind disclosed herein have proven that satisfactory operation may be obtained with a velocity as low as 850 ft. per minute in the conveyor conduit 9, higher velocities are found more desirable, and a velocity of more than 2000 ft. per minute and preferably 3000 ft. per minute is found desirable for consistent good operating results in handling magnesium dust. This velocity is obtained by control of the primary gas through the nozzle and should be maintained regardless of whether secondary gas is admitted behind the nozzle as in some instances secondary gas may not be required.

The dust feeder herein shown represents one form of feeder which may be used for delivering dust to the action of the jet and to the Venturi chamber, though the success of the conveying operation does not depend upon the construction of this feeder as other types of feeders may be substituted therefor with good results.

While the invention herein disclosed is illustrated as a means for conveying magnesium dust from one bin to another it is not intended to be limited to this use as it may be employed to advantage in conveying dust directly from the point of its production to the locality of a subsequent step in the manufacture or processing of metallic magnesium or other product, such as means for mechanically or chemically separating the various components of the dust.

I claim:

1. Apparatus for conveying finely divided solids comprising, a dust bin, a vertical discharge pipe depending therefrom comprising upper and lower sections, a rotary feeder disposed between said sections comprising a rotor having a series of radially extending vanes enclosed at each end by a solid plate and forming a sealed connection with said upper section, a housing for said rotary feeder mounted upon the vertical discharge pipe to form an interspace therebetween, means for flushing out said interspace with gas under pressure and for discharging said gas as secondary gas into the lower section of the discharge pipe, a conveyor conduit having a Venturi throat connected to the opposite end of said lower section, and a nozzle vertically disposed in the lower end of the discharge pipe and adapted to eject a jet of gas at high velocity to propel the solids through the Venturi throat of the conduit.

2. Apparatus for conveying finely divided solids comprising, a dust bin, a vertical discharge pipe depending therefrom comprising upper and lower sections, a rotary feeder disposed between said sections comprising a rotor having a series of radially extending vanes enclosed at each end by a solid plate and forming a sealed connection with said upper section, a housing for said rotary feeder mounted upon the vertical discharge pipe to form an interspace therebetween, means for flushing out said interspace with gas under pressure and for discharging said gas as secondary gas into the lower section of the discharge pipe, means for discharging a supplementary secondary gas stream into said lower section, a conveyor conduit having a Venturi throat connected to the opposite end of said lower section, and a nozzle vertically disposed in the lower end of the discharge pipe and adapted to eject a jet of gas at high velocity to propel the solids through the Venturi throat of the conduit.

3. Apparatus for conveying finely divided material by means of a gas comprising, a dust bin, mechanically operable feeder means including a rotor having a series of radially extending vanes enclosed at each end by a solid plate and adapted to form a pneumatically sealed connection with said bin, a chamber adjacent said feeder and adapted to be supplied with said material at a predetermined rate by said feeder means, a Venturi throat communicating on one side with said chamber and communicating on its opposite side wit a conveyor conduit of smaller cross-sectional area than said chamber, means for discharging a primary portion of said gas into said chamber and towards said venturi, and means for discharging a secondary portion of said gas into said chamber at a location further removed from said venturi than said first mentioned means, said primary and secondary means being adapted to produce within said chamber a turbulence between said gas and said material and to convey said material through said venturi and said conveyor conduit.

4. Apparatus for conveying finely divided material by means of a gas comprising a dust bin, mechanically operable feeder means including a rotor having a series of radially extending vanes enclosed at each end by a solid plate and adapted to form a pneumatically sealed connection with said bin, a chamber adjacent said feeder and adapted to be supplied with said material at a predetermined rate by said feeder means, a Venturi throat communicating on one side with said chamber and communicating on its opposite side with a conveyor conduit of smaller cross-sectional area than said chamber, means for discharging a primary portion of said gas into said chamber and toward said venturi, and means for discharging a secondary portion of said gas into said chamber in a direction tangential to the flow effected by said primary discharge means and adapted to increase the turbulence within said chamber, said primary and secondary discharge means being adapted to convey said material through said venturi and said conveyor conduit.

5. Apparatus for conveying finely divided material by means of a gas comprising a dust bin, a mechanically operable feeder including a rotor having a series of radially extending vanes enclosed at each end by a solid plate and adapted to form a pneumatically sealed connection with said bin, a housing for said rotary feeder mounted adjacent to said solid plates and adapted to form an interspace therebetween, a chamber adjacent to said feeder and adapted to be supplied with said material at a predetermined rate by said feeder, a Venturi throat communicating on one side with said chamber and communicating on its opposite side with a conveyor conduit of smaller cross-sectional area than said chamber, means for discharging a primary portion of said gas into said chamber and towards said venturi, and means for discharging a secondary portion of said gas into said chamber at a location further removed from said venturi than said first mentioned means, said primary and secondary means being adapted to produce within said chamber a turbulence between said gas and said material and to convey said material through said venturi and said conveyor conduit.

6. Apparatus for conveying finely divided material by means of a gas comprising a dust bin, a mechanically operable feeder including a rotor having a series of radially extending vanes enclosed at each end by a solid plate and adapted to form a pneumatically sealed connection with said bin, a housing for said rotary feeder mounted adjacent to said plates and adapted to form an interspace therebetween, a chamber adjacent to said feeder and adapted to be supplied with said material at a predetermined rate by said feeder, a Venturi throat communicating on one side with said chamber and communicating on its opposite side with a conveyor conduit of smaller cross-sectional area than said chamber, means for discharging a primary portion of gas under pressure into said chamber and towards said venturi, and means for discharging a secondary portion of said gas into said chamber in a direction tangential to the flow effected by said primary discharge means, said primary and secondary discharge means being so constructed and arranged as to create a turbulent mixture of gas and finely divided material within said chamber and to induce the flow of said gas and said material through said Venturi throat and said conveyor conduit.

GERALD I. McBRIDE.

REFERENCES CITED

The following references are of record in the file of this patent:

UNITED STATES PATENTS

| Number | Name | Date |
| --- | --- | --- |
| 228,206 | Luckenbach | June 1, 1880 |
| 738,133 | Weaver | Sept. 1, 1903 |
| 741,116 | De France | Oct. 13, 1903 |
| 1,276,653 | Herbert | Aug. 20, 1918 |
| 1,465,269 | Horn | Aug. 21, 1923 |
| 1,535,991 | Crom | Apr. 28, 1925 |
| 1,552,905 | Zimmermann | Sept. 8, 1925 |
| 1,566,517 | Bergman | Dec. 22, 1925 |
| 1,697,584 | Aikins | Jan. 1, 1929 |
| 1,742,716 | Meyer | Jan. 7, 1930 |
| 1,789,692 | Rosencrants | Jan. 20, 1931 |
| 1,970,405 | Thomas | Aug. 14, 1934 |
| 2,123,537 | Marr | July 12, 1938 |
| 2,327,337 | Burch | Aug. 24, 1943 |